United States Patent [19]
Del Piero

[11] 3,804,573
[45] Apr. 16, 1974

[54] MOLDING APPARATUS

[75] Inventor: Elio Del Piero, Zaventem, Belgium

[73] Assignee: Solvay & Cie, Brussels, Belgium

[22] Filed: June 3, 1971

[21] Appl. No.: 149,450

[30] Foreign Application Priority Data
June 16, 1970 Belgium .................................. 90410

[52] U.S. Cl....425/387 B, 425/326 B, 425/DIG. 204, 425/DIG. 211, 425/DIG. 212
[51] Int. Cl............................................. B29d 23/03
[58] Field of Search ....... 425/387 B, 387 BJ, 326 B, 425/342, DIG. 204, DIG. 206, DIG. 211, DIG. 212

[56] References Cited
UNITED STATES PATENTS
3,596,315   8/1971   Yoshikana et al. .............. 425/326 X
2,515,093   7/1950   Mills ................................... 425/326
3,146,491   9/1964   Eyquem ............................. 425/326

FOREIGN PATENTS OR APPLICATIONS
996,186   6/1965   Great Britain ...................... 425/326
39-3580   7/1960   Japan .................................. 425/326
195,727   4/1965   Sweden .............................. 425/326

Primary Examiner—Richard B. Lazarus
Attorney, Agent, or Firm—Spencer & Kaye

[57] ABSTRACT

Apparatus for molding hollow bodies from plastic material by blow extrusion has a rotatable support with a plurality of successive, continguous molds arranged thereon, for rotation therewith. Each of the molds has a blowing device and an ejector associated therewith and arranged in the bottom portion of the mold preceeding the associated mold.

10 Claims, 3 Drawing Figures

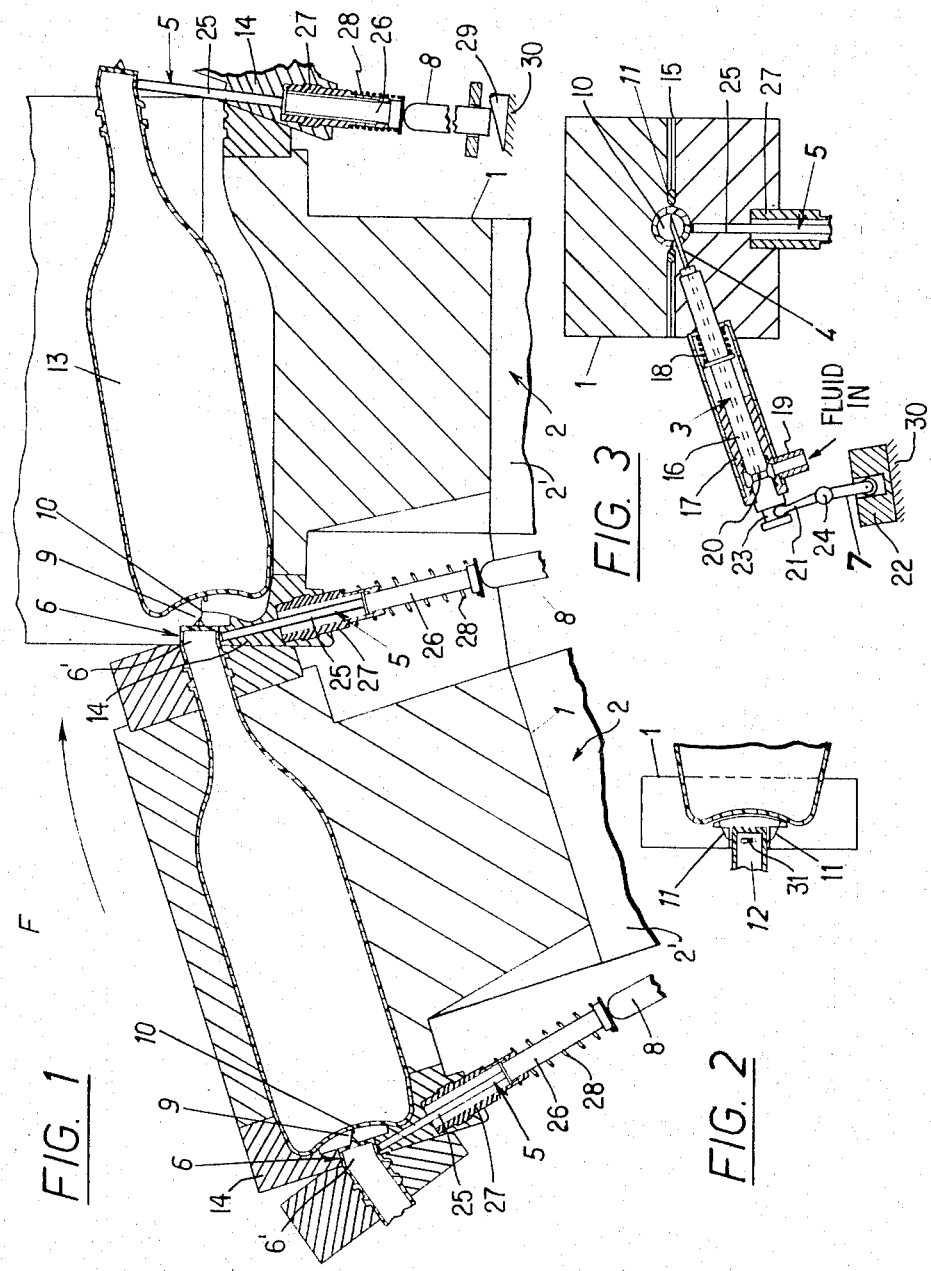

MOLDING APPARATUS

BACKGROUND OF THE INVENTION

The present invention relates to a rotary apparatus for molding hollow bodies from plastic material by blow extrusion, which enables wastage of the plastic material to be reduced to a minimum, while realizing good cooling of the molded objects.

Rotary apparatus for molding hollow bodies from plastic material by blow extrusion have already been proposed. These known devices have a series of separable molds disposed one behind the other and relatively contiguously on a rotary-table support. This support, which may be either a circular or other shaped plate, optionally provided with radial arms, or a chain, performs a continous or discontinuous movement and is equipped with means for closing the molds at the moment when they receive a tubular parison delivered by an extrusion head. Each mold is also provided with means for blow forming the portion of parison contained in it, for cooling the hollow body thus formed, and for ejecting the latter after the opening of the mold.

A rotary apparatus equiped with a chain supporting the molds is described in U.S. Pat. No. 2954 581. Blow forming is generally effected by means of a hollow needle which pierces the portion of parison either axially or laterally in a region situated beyond the region intended to form the neck of the hollow body to be molded.

These known apparatus, which are particularly characterized by high productivity, nevertheless result in a rather considerable wastage of plastic material.

The hollow bodies produced are, in fact, separated from one another after molding by a wasted portion of parison the length of which is equal to the total of the excess length of parison permitting the introduction of the blowing needle, the thickness of the head of the mold, the distance separating the closing planes of two successive molds, and the thickness of the bottom of the mold.

It is undoubtedly possible in the known apparatus to reduce this wastage of material to a certain extent, particularly by making the molds contiguous at their closing plane and reducing the thickness of the head of the molds.

On the other hand, however, it is not possible for the length of parison necessary for introducing the blowing needle to be reduced beyond a certain limit without making this operation unreliable.

Similarly, the reduction of the thickness of the bottom of the mold cannot exceed a certain limit without encountering problems in connection with the cooling of the bottoms of the molded hollow bodies.

SUMMARY OF THE INVENTION

An object of the present invention is to provide a rotary apparatus for molding hollow bodies from plastic material by blow extrusion of the type described above, that makes it possible for the wastage of plastics material to be reduced to a minimum.

In a rotary apparatus according to the present invention, the blowing device for each parison portion contained in a mold is accommodated in the bottom portion of the preceding mold.

In this manner, use is made of the thickness of the bottom of each mold to accommodate therein the length of parison necessary for effecting the correct blowing of the parison portion contained in the following mold, thus making it possible to reduce very considerably the wastage of plastic material.

As ejectors must preferably apply their action to a superfluous portion of the molded hollow bodies, it is likewise advantageous to accommodate them in the bottom portions of the molds in such a manner that each of them acts on the portion of parison used for the blowing. In this manner, each molded hollow body is extracted from its mold by an ejector which is accommodated in the bottom of the preceding mold along with the blowing device.

In a preferred embodiment of the present invention, each mold bottom portion may be equipped with means, such as cutting edges for shearing the end of the portion of parison when the respective mold is closed. In this case it is likewise convenient to provide means, such as recesses, in the bottom portions of the molds for the purpose of retaining, such as by gripping, the portion of parison thus cut-off in a respective mold. In this manner, the bottom portions of the molded hollow bodies are automatically trimmed without it being necessary to use a separate trimming device.

BRIEF DESCRIPTION OF THE DRAWINGS

FIG. 1 is a partial, schematic side elevational view of a rotary apparatus according to the present invention showing two consecutive molds at the moment when a molded hollow body is being ejected from the right-hand mold.

FIG. 2 is a schematic detail view showing a bottom portion of a mold.

FIG. 3 is a schematic cross-sectional detail view of a bottom portion of a mold, taken generally along the axes of a blowing needle and an ejector.

DESCRIPTION OF THE PREFERRED EMBODIMENTS

As can be seen from the drawings, an apparatus according to the present invention is composed of a plurality of successive molds 1 mounted contiguously on a suitable, known rotatable support 2 (FIG. 1). Rotatable support 2 may be, for example, a plurality of radial arms 2' mounted on a hub (not shown). The hub may then be mounted on a shaft (not shown) for rotation in a known manner.

In the bottom portion 14 of each mold 1 there is mounted a blowing device 3 (FIG. 3) having a movable hollow needle 4, and an ejection device 5 which acts on the end of a portion of a parison 6 constructed from, for example, a suitable, known synthetic resin, such as polyvinyl chloride or polyolefins, and arranged in the following mold 1. In addition, bottom portion 14 of each mold 1 is provided with an axial cylindrical opening 10 for receiving a region 6' of a portion of a parison 6 necessary for proper blowing of a portion of a parison 6 contained in the following mold 1.

A device for moving needles 4 and elements 8 for moving the ejectors 5 should be regulated in such a manner that:

a needle 4 pierces a portion of a parison 6 in an associated mold following the associated mold 1 only after the mold 1 has been closed;

this same needle 4 is withdrawn from the portion of a parison 6 before the opening of the mold 1 in the bottom portion 14 of which needle 4 is accommodated, in order to permit the return to atmospheric pressure of each hollow body 13 before the opening of the mold preceding the one containing the hollow body; and ejector 5 comes into operation to eject a hollow body 13 only after the mold 1 following the associated mold is completely open.

Each blowing device 3 has in addition to a needle 4 a sleeve 16 (FIG. 3) surrounding needle 4 for movement therewith in a housing 17. A suitable, known spring, such as a coiled helical spring 18, is arranged in housing 17 for biasing sleeve 16 and needle 4 toward the inoperative position for needle 4 (not shown). A fitting 19 is provided in housing 17 for a suitable, known blowing fluid to enter into hollow needle 4 through a manifold 20. The fluid may enter needle 4 through manifold 20 only when sleeve 16 and needle 4 have been advanced by device 7 into the operative position for needle 4 (FIG. 3).

Device 7 has a crank 21 which is actuated in a suitable known manner such as by a cam 22. One end of crank 21 rides in a groove 23 defined in sleeve 16. Groove 23 acts as a follower. By rocking crank 21 about its pivot point 24, sleeve 16 and needle 4 can be moved back and forth in housing 17.

Each ejector 5 has an ejector rod 25 mounted on a piston 26 arranged in a housing 27. A suitable, known spring, such as a coiled helical spring 28, is provided for normally biasing piston 26 toward a respective lifting element 8. By the proper actuation of elements 8, ejector rod 25 will eject hollow bodies 13 in the proper sequence.

Devices 7 and elements 8 may be actuated in proper sequence in any suitable, known manner. For example, cams 22, (FIG. 3) and 29 (FIG. 1) may be provided. These cams may be fixedly mounted on a suitable, known stationary machine frame 30 and are arranged such that the desired sequence of actuation of blowing devices 3 and ejector 5 may be realized. As molds 1 rotate on rotatable support 2, they pass cams 22, 29, and cranks 21 and elements 8, respectively, engage the cams 22, 29 and are actuated thereby. The arrangement of cams 22, 29 follows a logical sequence known to those skilled in the art, and the sequence of actuation may be varied by varying the location of the cams 22 and 29.

Each mold bottom portion 14 is preferably equipped with a cutting edge 9 of the shears type for shearing on the closing of a respective mold 1, the end of a portion of a parison 6 to be pierced by the associated needle 4, and defines an axially extending opening 10 of a thickness, of, for example, about 1mm which secures the end of a portion of a parison 6 arranged in a respective mold 4 and prevents it from falling into the mold 1 following the respective mold 1 after the cutting operation.

Cutting edges 9 may be a pair of knife edges arranged one in each half of a mold 1 such that they mate when the mold 1 is closed, and will, in the process of the closing of a mold 1, cut through a portion of parison 6 arranged in adjacent molds 1.

Finally, recess 10 is provided with laterally extending edges 11, (FIG. 2) between which the front end of a portion of a parison 6 is gripped on the closing of the respective mold 1. These edges 11 effect the transport of the portion of a parison 6 in the direction of rotation of the molds 1, arrow F in FIG. 1. Edges 11 may optionally permit axial drawing of a parison 6 by adequate control in a known manner of the speed of rotation of the molds 1 in dependence on the speed of extrusion of the portion of parison 6. Because of the existence of these gripping edges 11, situated in the plane of closure 15 of the molds 1, it is obviously convenient for the associated blowing needles 4 to move outside this plane 15.

The apparatus as described above permits normal cooling of the bottoms of molded hollow bodies 13.

After the hollow bodies 13 have been removed from the molds 1, the portion 12 (FIG. 2) extending beyond their neck and showing the marks 31 left by a blowing needle 4 and by an ejector 5 is removed in a known manner by a subsequent trimming operation.

It will be understood that the above description of the present invention is susceptible to various modifications, changes and adaptations, and the same are intended to be comprehended within the meaning and range of equivalents of the appended claims.

I claim:

1. Apparatus for molding hollow bodies from plastic material by blow extrusion, comprising, in combination a rotatable support, a plurality of molds each having a neck portion and a bottom portion, the molds being contiguously mounted on said rotating support for rotation therewith, the neck portion of each mold extending into the bottom portion of the preceding mold, and each of the molds having a blowing device associated therewith and arranged in the bottom portion of the mold preceding the associated mold.

2. Apparatus as defined in claim 1, further including means for ejecting hollow bodies from the molds and having an individual ejector arranged in the bottom portion of the mold preceding a mold associated with the ejector.

3. Apparatus as defined in claim 2, wherein each blowing device has a movable hollow needle which pierces the end of a portion of a parison in the associated mold in a region beyond a region of the portion of a parison which will form the neck of a hollow body.

4. Apparatus as defined in claim 3, wherein each device of said means for ejecting contacts a hollow body in the same region as the associated hollow needle.

5. Apparatus as defined in claim 4, further including means having a cutting edge arranged in the mold bottoms for shearing on the closing of a respective mold the end of a portion of a parison to be pierced by the associated hollow needle, and means associated therewith and having recesses for retaining the cut-off portion of a portion of a parison in a respective mold.

6. Apparatus as defined in claim 5, wherein the means for retaining has laterally extending edges for gripping a cut-off portion of a portion of a parison in a respective mold.

7. Apparatus as defined in claim 6, wherein each of said bottom portions defines a cylindrical opening for receiving the region of a portion of a parison in which the associated hollow needle will pierce.

8. Apparatus as defined in claim 7, further including means for moving the hollow needles such that a respective hollow needle pierces a portion of a parison in an associated mold only after the mold following the associated mold has been closed, and is withdrawn from the portion of a parison before the opening of the mold in the bottom portion of which the respective hollow needle is arranged, in order to permit the restoration to atmospheric pressure of each hollow body before the opening of the mold preceding the respective mold of the hollow body.

9. Apparatus as defined in claim 8, further including means for moving said ejector such that a respective ejector ejects a hollow body only after the mold following the associated mold is completely open.

10. Apparatus as defined in claim 1, further comprising means for opening and closing said contiguously mounted molds sequentially.

* * * * *